United States Patent
Dhara et al.

(10) Patent No.: US 8,483,375 B2
(45) Date of Patent: Jul. 9, 2013

(54) SYSTEM AND METHOD FOR JOINING CONFERENCE CALLS

(75) Inventors: Krishna Kishore Dhara, Dayton, NJ (US); Venkatesh Krishnaswamy, Holmdel, NJ (US); Eunsoo Shim, Princeton Junction, NJ (US); Xiaotao Wu, Edison, NJ (US)

(73) Assignee: Avaya, Inc., Basking Ridge, NJ (US)

( * ) Notice: Subject to any disclaimer, the term of this patent is extended or adjusted under 35 U.S.C. 154(b) by 301 days.

(21) Appl. No.: 12/896,674

(22) Filed: Oct. 1, 2010

(65) Prior Publication Data

US 2011/0228922 A1     Sep. 22, 2011

Related U.S. Application Data

(60) Provisional application No. 61/315,719, filed on Mar. 19, 2010.

(51) Int. Cl.
*H04M 3/42*     (2006.01)

(52) U.S. Cl.
USPC ............. 379/202.01; 370/260; 709/204

(58) Field of Classification Search
USPC ............. 379/202.01; 370/260; 709/204
See application file for complete search history.

(56) References Cited

U.S. PATENT DOCUMENTS

| | | | |
|---|---|---|---|
| 6,141,339 A | 10/2000 | Kaplan et al. | |
| 6,633,868 B1 | 10/2003 | Min et al. | |
| 6,798,753 B1 | 9/2004 | Doganata et al. | |
| 7,010,115 B2 | 3/2006 | Dezonno et al. | |
| 7,499,535 B1 | 3/2009 | Ivory et al. | |
| 2002/0091769 A1 | 7/2002 | Drozdzewicz et al. | |
| 2002/0136382 A1 | 9/2002 | Cohen et al. | |
| 2003/0154249 A1* | 8/2003 | Crockett et al. | 709/204 |
| 2004/0078436 A1* | 4/2004 | Demsky et al. | 709/206 |
| 2005/0227680 A1* | 10/2005 | Snowden | 455/416 |
| 2007/0005409 A1 | 1/2007 | Boss et al. | |
| 2007/0033251 A1 | 2/2007 | Mandalia et al. | |
| 2008/0013706 A1 | 1/2008 | Kelley et al. | |
| 2008/0226050 A1 | 9/2008 | Leppisaari et al. | |

(Continued)

FOREIGN PATENT DOCUMENTS

WO    WO 2010/045070    4/2010

OTHER PUBLICATIONS

Riedel, Alexander, "Collaborative Scheduling Using Context-Awareness", KTH Information and Communication Technology, Master of Science Thesis, Stockholm, Sweden, 2010. TRITA-ICT-EX-2010:35, Mar. 25, 2010.

(Continued)

*Primary Examiner* — Creighton Smith

(57) ABSTRACT

Disclosed herein are systems, methods, and non-transitory computer-readable storage media for scheduling an event to automatically join a user to a conference call. In one aspect, the method includes receiving an invitation for a user to join a conference call, extracting from the invitation a scheduled conference call time, conference call address information, conference call authentication information, and a conference call modality, and scheduling an event to join the user to the conference call via the conference call modality at the scheduled conference call time based on the conference call address information and the conference call authentication information. In another aspect, the system retrieves a scheduled event at a scheduled time, extracts the address, authentication, and modality information for the conference, and joins the user to the conference automatically at the scheduled time.

14 Claims, 5 Drawing Sheets

U.S. PATENT DOCUMENTS

| | | | |
|---|---|---|---|
| 2008/0226051 | A1 | 9/2008 | Srinivasan |
| 2009/0013045 | A1 | 1/2009 | Maes et al. |
| 2011/0022967 | A1 | 1/2011 | Vijayakumar et al. |
| 2011/0022976 | A1 | 1/2011 | Huang et al. |
| 2011/0182415 | A1* | 7/2011 | Jacobstein et al. ....... 379/202.01 |
| 2012/0230485 | A1* | 9/2012 | Yap et al. ................. 379/202.01 |

OTHER PUBLICATIONS

Singh et al., "Distribution AI, Schedules, and Semantic Web", Automated Scheduling, www.xml-journal.com, pp. 40-45, Nov. 2002.

Melchiorre et al., "inContext-Interaction and Context-based Technologies for Collaborative Teams", *Collaboration and the Knowledge Economy: Issues, Applications, Case Studies*, vol. 5, Information and Communication Technologies and the Knowledge Economy, IOS Press, Amsterdam, 2008.

Chen et al., "Intelligent Agents Meet Semantic Web in a Smart Meeting Room", *Proceedings of the Third International Joint Conference on Autonomous Agents & Multi Agent Systems (AAMS 2004)*, New York City, NY, Jul. 2004.

Dourish et al., "Information and Context: Lessons from a Study of Two Shared Information Systesm", *In COCS '93: Proceedings of the conference on Organizational computing systems*, 1993, pp. 42-51.

\* cited by examiner

SYSTEM AND METHOD FOR JOINING CONFERENCE CALLS

RELATED APPLICATIONS

This application claims priority to U.S. Provisional Application 61/315,719, filed 19 Mar. 2010, the contents of which are herein incorporated by reference in their entirety.

BACKGROUND

1. Technical Field

The present disclosure relates to communications and more specifically to conference calls and similar communications.

2. Introduction

When a user is invited to a conference call or creates a conference call, the user receives a set of information, such as a telephone number and access code or a web conference link, to join the conference. When the time of the conference arrives, the user and the other invited parties must first locate the conference dial-in or other information to join the conference. Often the user further requires access to additional resources such as documents, spreadsheets, contact information, or To Do lists for the conference. Often searching for the correct resources takes time and distracts the user from effectively participating in the conference while tracking down the right documents or information. Alternatively, conference participants can spend significant amounts of time preparing for the conference, including remembering and tracking down the right documents or information. This leads to much wasted time and lost worker efficiency.

One solution to this approach is to email out attachments with a conference call invitation, but that introduces multiple problems of version control, overly large email attachments, differing sets of documents for different individuals on the conference call, and other problems. Another approach is to force users to input required information in a structured way, but in reality, people still often put all these information in unstructured plain text. These approaches are not time effective and/or introduce additional problems taking away from the efficiency and ease of use of a conference call.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for automatic entry to a conference call and for automatically retrieving resources associated with the conference call. The system can automatically enter the conference call based on a trigger event and/or the system can enter the conference call based on user input such as a click or a voice command. In one embodiment, a system practicing the method first receives an invitation for a user to join a conference call. The system extracts from the invitation a scheduled conference call time, conference call address information, conference call authentication information, and a conference call modality. The system can extract this information via fuzzy logic, machine learning, and/or a regular expression. Further, the system can detect a set of resources associated with the conference call, such as documents, phone numbers, images, and so forth. The system can then schedule an event to join the user to the conference call via the conference call modality at the scheduled conference call time based on the conference call address information and the conference call authentication information. The system can also include in the event links to the resources, a list or manifest of all the resources, or individual or shared copies of the resources. Using this scheduled event, the system can then, at the scheduled time, retrieve the event, automatically join the conference based on the stored information, and automatically retrieve the resources or links to the resources for the conference.

In one aspect, the system also monitors user communications for modifications to the conference call after the event has been scheduled, such as a conference moderator sending an email notifying invited conference participants that the call is postponed until the next day, and, if a modification to the conference call is found, the system updates the event based on the modification. In another aspect, the system extracts, from a user profile or other source, optional user information that is not necessary to join the conference call, such as a user's first name, and submits the optional user information when joining the conference call, such as converting the user's name to speech and audibly announcing the user's name as the system joins the conference on the user's behalf.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for joining conference calls in a more efficient and user-friendly way. A system, method and non-transitory computer-readable media are disclosed which schedule automatic entry to a conference call and which automatically retrieve resources associated with the conference call. A brief introductory description of a basic general purpose system or computing device which can be employed to practice the concepts is disclosed herein in FIG. 1. A more detailed description of the methods will then follow. Assorted variations are discussed herein as the various embodiments are set forth. The disclosure now turns to FIG. 1 and shall thereafter return to a discussion of conference calls.

Figure 1:
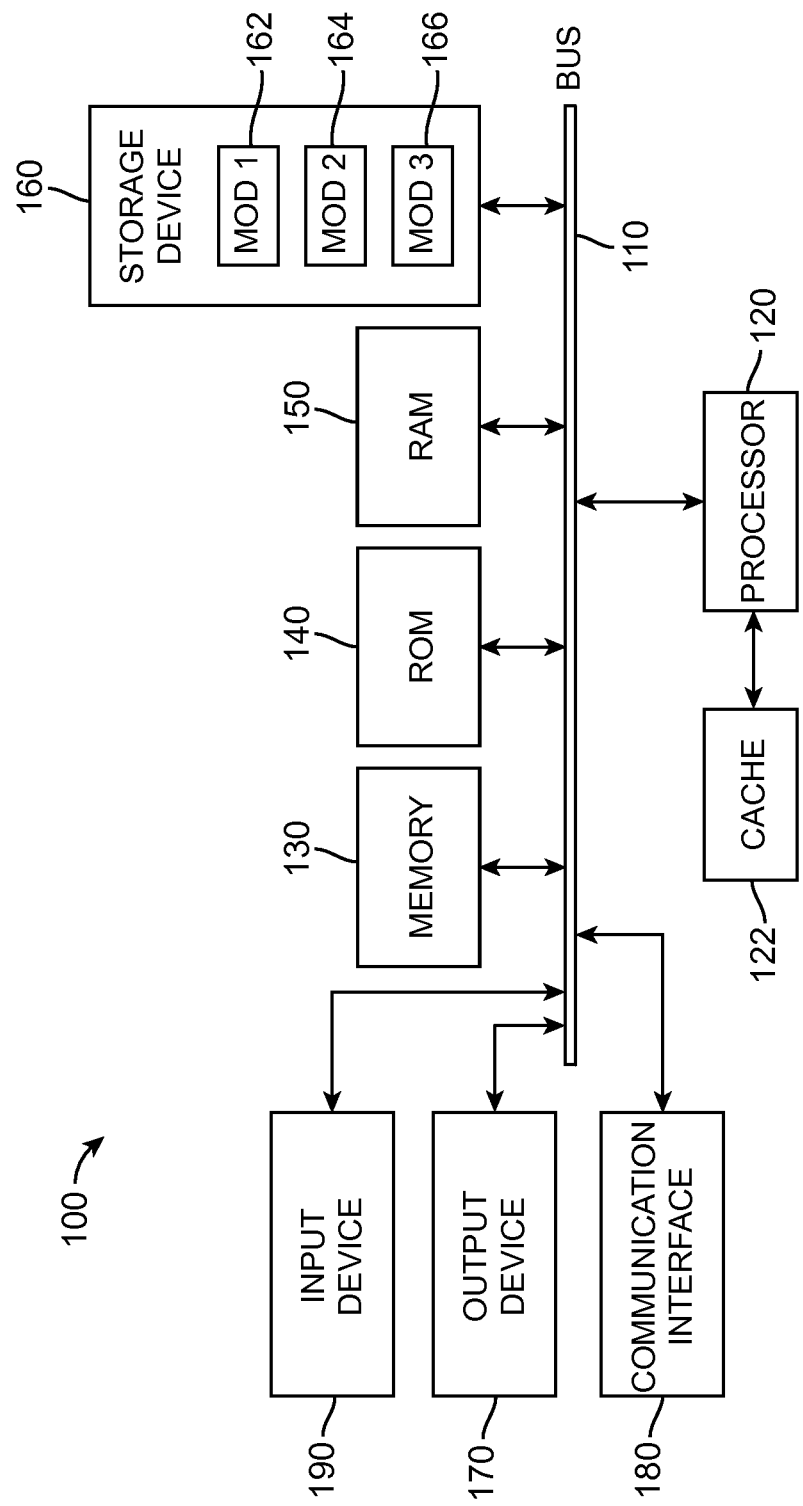
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some basic computing device components, the disclosure returns to a discussion of how to increase user efficiency and ease of use in conference calls. The approaches disclosed herein can, in one embodiment, assemble all the resources a user needs to join a conference with a single click or without any user interaction. The system can mine the data sources and organize a view of what a user needs for a conference call and activate the resources with one click or automatically. The system can call in or join the conference call for the user, including entering the conference code, opening a web conferencing link, retrieving documents, and so forth. The system can even automatically announce the user's name as the user enters the conference call. This approach generally applies to conference calls, but can also apply to other communications such as a group chat room (i.e. IRC or other instant message application) or a video conference. In the case of a group chat, the system can open the group chat client (or navigate to the appropriate URL), log in for the user, select the right group chat session, and enter it automatically. The system can use fuzzy logic, machine learning, and/or regular expression matching to extract conference call information, determine which resources to retrieve for the conference call, and so forth.

In one aspect, different callers require different resources. For example, a conference organizer or a senior manager may need a more broad set of documents and resources than one of the participants. Similarly, one participant may need access to a specific set of information to which others do not need access based on that participant's particular responsibilities or previously assigned tasks.

One advantage of the approaches set forth herein is that a communications system can identify and automatically connect to a conference call or other group communication and also automatically retrieve or suggest relevant documents and resources in a just-in-time context for the conference call instead of a person manually deciding which documents and resources are needed and then searching for those documents while simultaneously attempting to communicate on the conference call.

This approach can automatically retrieve relevant and potentially relevant resources (such as documents, pieces of information, previous correspondence, contacts, etc.) for a conference call, including automatic login information, based on a conference call invitation or other communication information. When this system automatically joins a user to a conference call, the system enhances user/customer efficiency by saving them from remembering which resources relate to a conference call, searching for those resources, and opening those resources all while simultaneously participating in the conference call, for example. This approach also saves the user/customer the hassle of entering a calendar event, remembering to dial in, looking up what the dial-in number and pass code are, and so forth.

Figure 2:
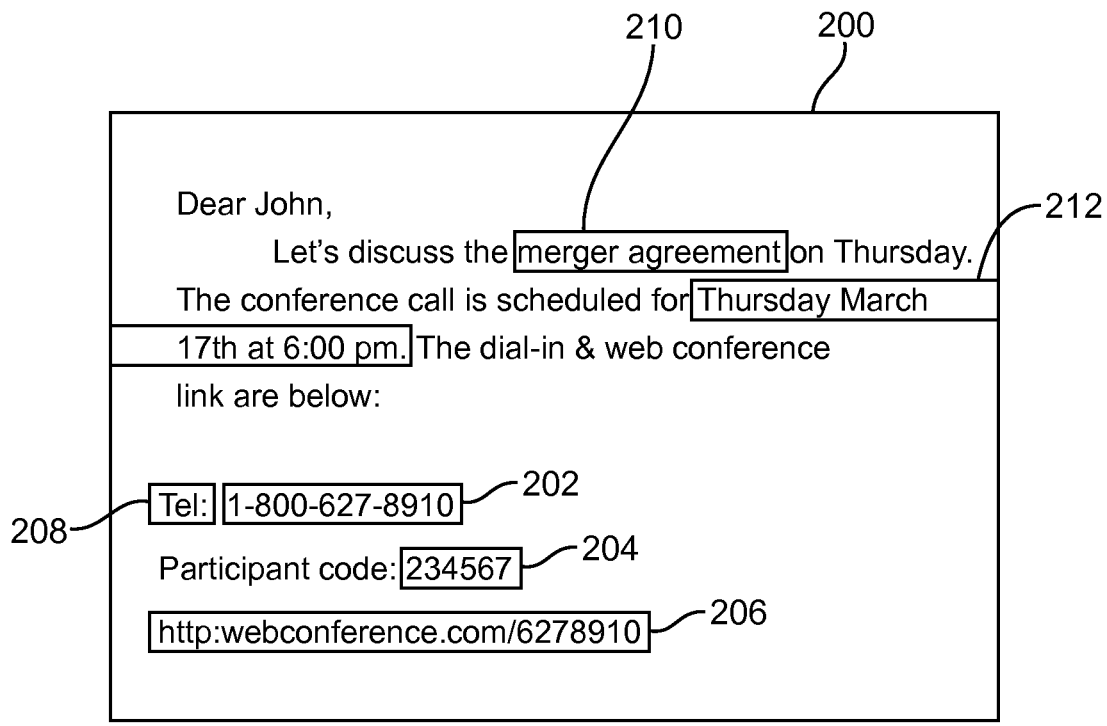
FIG. 2 illustrates an example conference call invitation.

FIG. 2 illustrates an example conference call invitation 200. This invitation 200 is an email, but conference invitations can take many other forms, such as text message, telephone call, and web link. The system 100 extracts information from the invitation 200. The system 100 can extract information by regular expression, pattern matching, fuzzy logic, machine learning, by applying an information template to the invitation, and so forth. The system can recognize information such as a telephone number 202, a security code 204, a web address 206, a communication modality 208 such as telephone or video conference, a subject of the conference 210, and a date and time 212. The system 100 can apply simple pattern matching such as checking for strings 'http' or 'www' for web addresses 206. The system can apply a more complex regular expression or other algorithm to match telephone numbers 202 and their multiple variations. One such regular expression targeted at telephone numbers is provided below:

^([0-9](l-)?)?(\(?[0-9]{3}\)?|[0-9]{3})(l-)?([0-9]{3}(l-)?[0-9]{4}|[a-zA-Z0-9]{7})$

Other pieces of information, such as the conference subject 210, can require that the system perform a more sophisticated and meaningful analysis on the content of the message.

The system performing the information extraction can reside in a network or can be part of a user's communication device. For example, a mail server, such as a Microsoft Exchange server, can intercept and extract conference call information as it processes incoming and/or outgoing emails. When the server successfully extracts a conference call invitation, the server can add events to the appropriate users' calendars to trigger automatically joining the conference at the time and in the manner specified by the conference call invitation. In a user client example, a user's smartphone receives a text message invitation to a conference call. The text message can include an optional tag or other key phrase that triggers the receiving smartphone to parse the text message for conference call information. When the smartphone identifies conference call information, the smartphone schedules an event to automatically join the user to the conference and/or to present additional resources to the user during the conference. In either of these embodiments, the smartphone or mail server schedules a calendar event that triggers one or more action on one or more device to join the conference. For example, the calendar event can trigger a series of steps on multiple devices that perform at least some of the steps of connecting to the conference, entering authentication information, announcing the user, and connecting the user to the conference.

Figure 3:
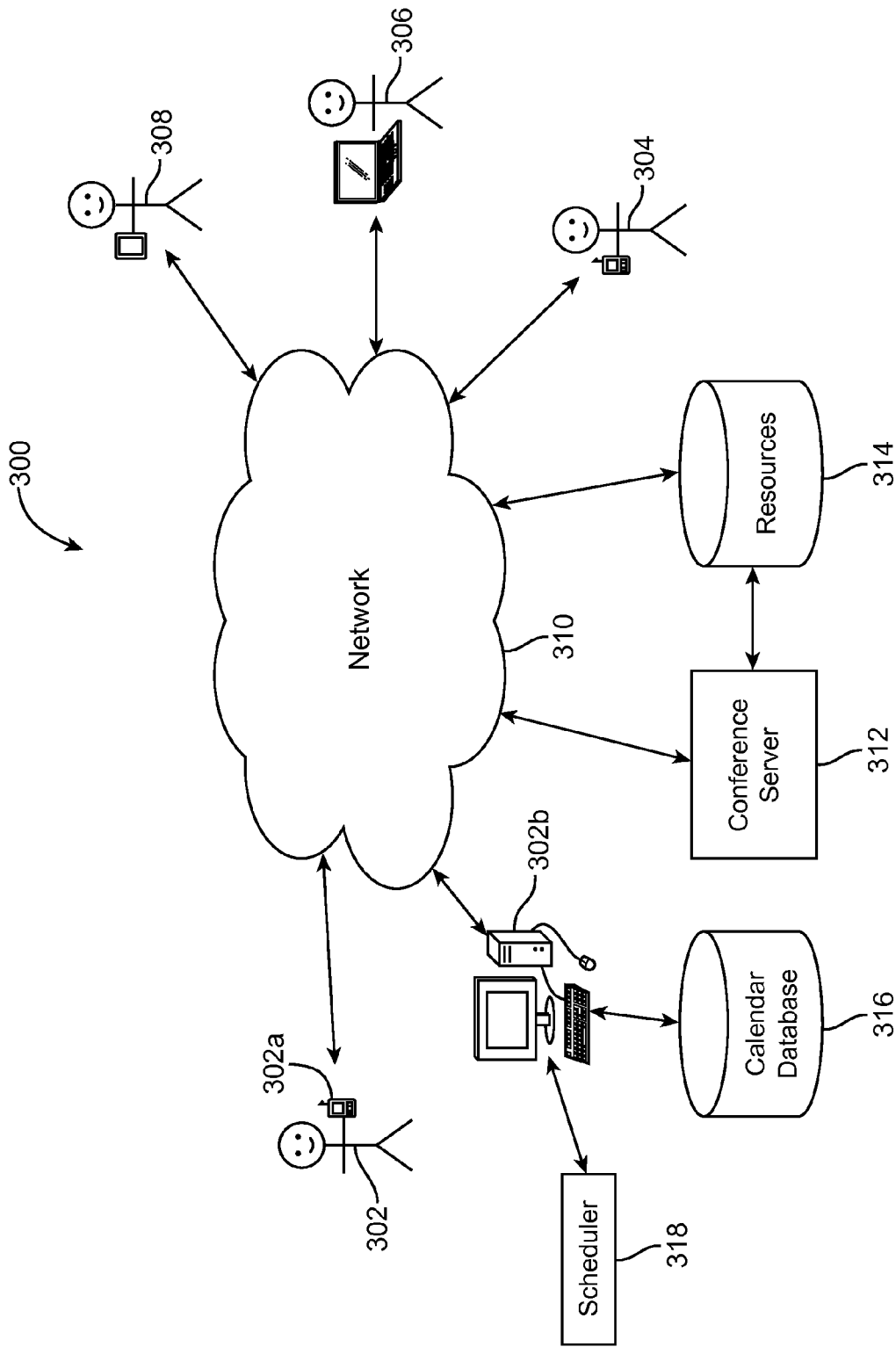
FIG. 3 illustrates an exemplary system infrastructure.

FIG. 3 illustrates an exemplary system infrastructure 300 for automatically joining users to conference calls. In this infrastructure 300, a user 302 receives a conference call invitation via a smartphone 302a or desktop computer 302b. Other users 304, 306, 308 receive an invitation to the same conference call. One or more of the devices extracts information from the invitation. One or both of the user's devices 302a, 302b can add an event to a calendar database 316 or can create a time-based event via a scheduler 318 based on the extracted information to automatically join the conference call.

In one aspect, the conference call is scheduled to join a conference call hosted via a central conference server 312. In this case, the system can send the conference server 312 a response to the invitation acknowledging receipt and confirming the user's planned attendance. The system can also provide a notification, such as a popup window, to the user that the system has automatically scheduled an event to automatically join the conference call on the user's behalf. The system can also schedule to open resources 314 associated with the conference call automatically. The resources 314 can be stored in the network, received with the conference call invitation, stored locally, or stored on another conference participant's device.

At the time of the conference or shortly before, the system 100 can select which device to connect to the conference call at the scheduled time based on user preferences and/or user presence information. For example, if the user is in the office, the system can use a desktop telephone to connect to the conference. If the user is in an airport, the system can use a smartphone or tablet device to connect to the conference. If the user is visiting an office that is not his regular office, the system can connect to the conference via Voice over IP (VoIP) or the telephone in the guest office. User preferences can also play a part. For example, the user preferences may indicate that at certain times of day only a desktop phone should join conference calls.

Figure 4:
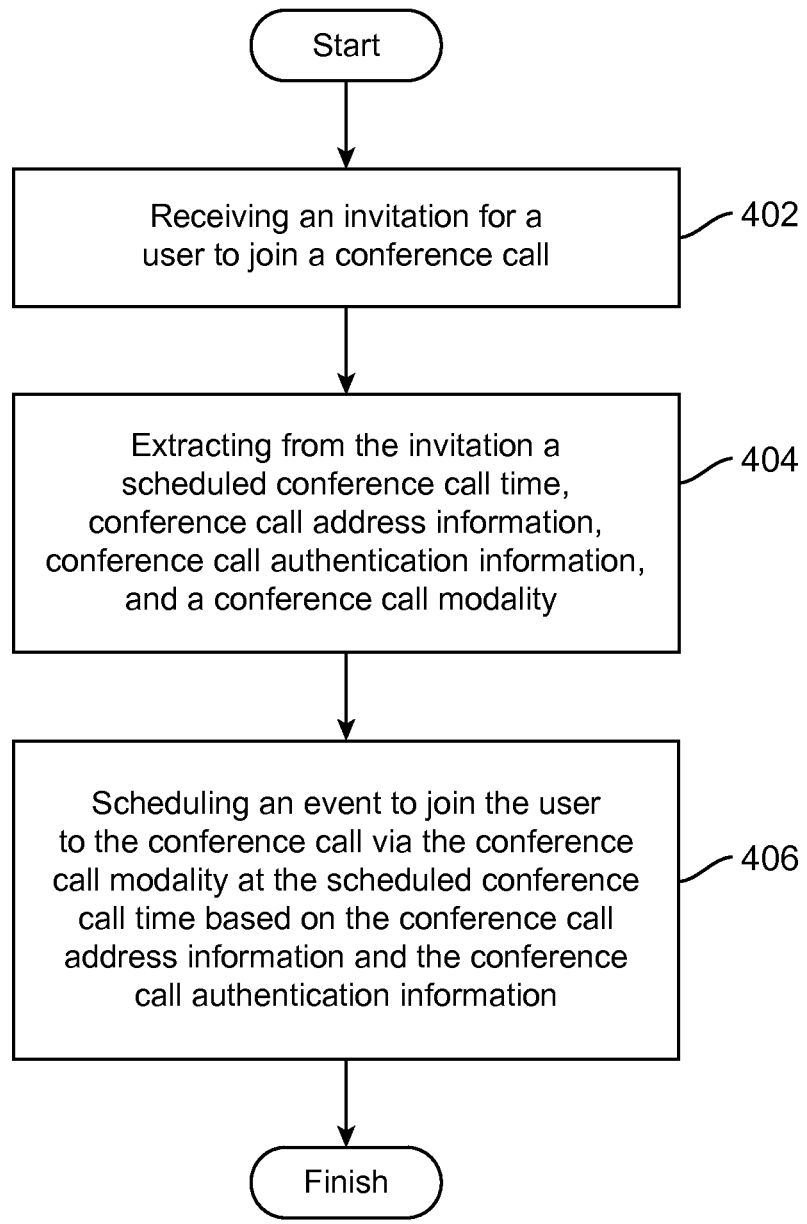
FIG. 4 illustrates a first example method embodiment.
Figure 5:
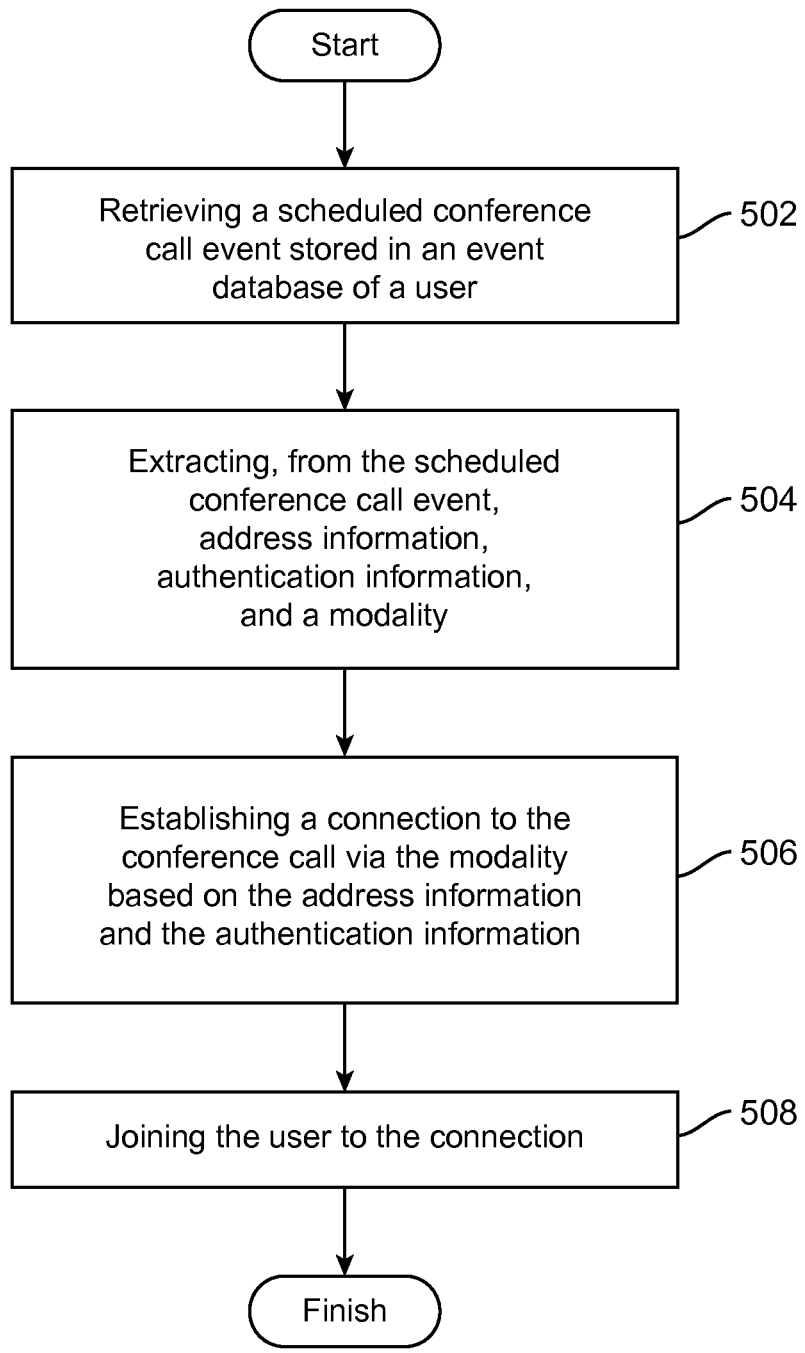
FIG. 5 illustrates a second example method embodiment.

Having disclosed some basic system components and concepts, the disclosure now turns to the two exemplary method embodiments shown in FIGS. 4 and 5. For the sake of clarity, the methods are discussed in terms of an exemplary system 100 as shown in FIG. 1 configured to practice the methods.

FIG. 4 illustrates a first example method embodiment for scheduling automatic entry to a conference call. The system 100 receives an invitation for a user to join a conference call (402). In a common implementation, users and/or automated systems send conference call invitations via email, but conference call invitations can be sent via other modalities such as text message. As another example, the system can perform speech recognition of an orally delivered conference call invitation by processing a voice message or by monitoring a telephone call.

The system 100 extracts from the invitation a scheduled conference call time, conference call address information, conference call authentication information, and a conference call modality (404). The system 100 can extract information via fuzzy logic, machine learning, and/or regular expressions. The system 100 can use a regular expression engine written in Perl, Python, Ruby, and/or other suitable language. The system 100 can ask the user to confirm the extracted conference call information. In one aspect, the system 100 asks the user to confirm the extracted information when the extracted information has a certainty below a threshold.

To assist in extracting information from the invitation, the system can also identify a conference information template that matches the invitation. For example, certain conferencing systems send out invitations in different formats with different arrangements of text and data. If the system 100 can identify a particular format of the data, extracting information therefrom is trivial. For example, if the system 100 knows that a Brand ABC conferencing system sent out the invitation, the system 100 can extract the schedule conference call time, the conference call address information, the conference call authentication information, and the conference call modality based on the conference information template for Brand ABC. The system 100 can include a list of commonly used or encountered templates by vendor, brand, user, and so forth. In one aspect, the system 100 receives template updates from vendors or from other users. Users can edit such templates to pick up additional information, to fix extraction errors, and for other reasons. Three example templates are shown below:

Example #1

Conference Call Invitation from [INVITING_PARTY] for [DATE] at [TIME]
   Dial-in Number: [ACCESS_NUMBER]
   Participant Code: [ACCESS_CODE]
   Moderator Code: [MODERATOR_ACCESS_CODE]

Example #2

[INVITING_PARTY] is inviting you to participate in a conference call.
   Date—[DATE]
   Time—[TIME]
   Tel—[ACCESS_NUMBER]
   Code—[ACCESS_CODE]

Example #3

Let's have a call this Monday, September 13th at noon to talk about upcoming events. We are a little off schedule because of the summer, but hopefully we will be able to continue with our regular conference calls on the first Monday of every month at noon. Please let me know if you won't be able to call in or if you have anything you would like to add to the agenda.

Conference call in number: [ACCESS_NUMBER]
   Access code: [ACCESS_CODE]

In the first example above, some information is in a structured form and other information is stored in a header line. In the second example above, other information, such as the telephone number, access code, date and time, is presented in a structured form. In the third example above, the template only provides guidance for the access number and access code, but the system 100 must perform additional processing on the body text of the message to extract the date and time. The system can also process the body text of the message to detect a recurring meeting structure (i.e. the 'regular conference calls on the first Monday of every month at noon') and establish a recurring pattern of scheduled events. Then, when the system joins the user for each recurring conference call, the system can also retrieve In one aspect, the system infers the communication modality from the template or from the information extracted. For example, if the system 100 extracts a number formatted as xxx-xxx-xxxx, the system 100 can infer that the communication modality is telephone. If the system 100 extracts an address like http://www.myconference.com/1234/index.html, the system can infer that the communication modality is web conference.

In some cases where a conference organizer manually generates a conference call invitation, the system or a user can generate a fuzzy template that matches the organizer's style and can assist in identifying useful conference call information from later invitations from in the organizer's style.

In some cases, the system 100 determines that the conference can accept additional, optional information, such as an audio announcement of a conference participant's name. The system can extract optional user information that is not necessary to join the conference call, such as an audio recording of the user's name, and submit the optional user information when joining the conference call. The system can extract this optional user information from a user profile. For example, the user can record, in advance, an audio announcement of their name for use when joining conferences. Alternatively, the system 100 can process the user's name as text through a text-to-speech module to generate a synthetic audio announcement of the user's name. Examples of optional user information include a text name, a spoken name, an image, a title, a maximum amount of time the user can participate in the conference call, a callback telephone number, schedule information, presence information, and contact information.

The system 100 schedules an event to join the user to the conference call via the conference call modality at the scheduled conference call time based on the conference call address information and the conference call authentication information (406). The event to join the user to the conference can require minimal or no user interaction. For example, the event can display a one-click popup on the user's screen asking to join the conference. In another embodiment, the system provides a warning or alert to the user that the system is about to join or is joining the conference. The user can ignore the warning or alert and wait for the system to automatically join the conference or the user can interact with the alert to modify or cancel the join. In one aspect, the system first performs a test connection to the conference call based on the event, receives feedback from the test connection, and updates at least one of the conference call address information, the conference call authentication information, and the conference call modality based on the feedback. Different conferencing setups may or may not allow for testing the connection to the conference.

In one optional variation, the system 100 further identifies a resource associated with the conference call and schedules the event further to open the resource in connection with joining the user to the conference call. For example, if the initiator of the conference call emailed out a conference call invitation with a spreadsheet as an attachment, the system can open the spreadsheet for the user automatically in connection with joining the conference call automatically.

The system 100 can monitor user communications after the event is scheduled for modifications to the conference call. If the system finds a modification to the conference call in a later email, telephone conversation, or instant message, the system updates the event based on the modification. The modification can include cancelling or delaying the conference call.

FIG. 5 illustrates a second example method embodiment for joining a conference call automatically. The system 100 retrieves a scheduled conference call event stored in an event database of a user (502). The system can retrieve the scheduled conference call before a scheduled time for the scheduled conference call event. In one aspect, the system retrieves the scheduled conference call at a time interval before the schedule time. The time interval can be based on an expected amount of time required to connect to the conference call.

The system 100 extracts, from the scheduled conference call event, address information, authentication information, and a modality (504). The address information can be a telephone number, a web address, a video conference address, or an IP address, for example. The authentication information can be a password, a pass code, and/or a personal identification number.

The system 100 establishes a connection to the conference call via the modality based on the address information and the authentication information (506) and joins the user to the connection (508). In one aspect to further save user time and effort, the system identifies a resource associated with the conference call, and schedules the event further to open the resource in connection with joining the user to the conference call. The resource can include a document, image, spreadsheet, contact information, calendar, email attachment, or other resource.

The disclosure now turns to a more in-depth discussion of the machine learning approaches to information extraction referred to above. Machine learning algorithms can extract communication session information, such as conference bridge number and participant code, from users' emails or appointments. The system can then use the retrieved information to easily setup a communication session, for example, dialing conference bridge number and entering a participant code, as well as popping up web conference links with limited or no user interaction. The system can also verify the retrieved information by monitoring users' communication sessions.

Identifying phone numbers can require at least some natural language processing. In addition, if the target number is a conference bridge number and requires participant code for joining the conference, the system can also identify the participant code. The system can dial the conference number and enter the participant code in sequence to join a conference. Simply making numbers appearing in a web page clickable does not appropriately handle complicated scenarios, such as joining a conference.

Using natural language processing and text analysis techniques to acquire the semantic meanings of numbers in a document can certainly help to identify phone numbers. Natural language processing must deal with almost endless variations in how people specify their meeting information. For example, the string below (with the real numbers modified for security and privacy reasons) is copied from a real appointment that specifies a conference bridge number with participant code and host code:

720 300 2000 p 022222 h 922222

These kinds of strings are often used to setup meeting appointments in enterprises. This string is not generally suitable for semantic analysis because it includes few or no meaningful words. However, if people follow similar patterns to specify appointments and the system can learn the patterns, the system can then extract meaningful numbers from the strings.

According to test appointments, people in different organizations usually use similar patterns or sets of patterns to specify their conference information. Extracting meaningful numbers is just the first step for one-click and/or automatic session setup. The system also need to at least identify the dialing sequence and the role of the dialing party. For example, a regular phone call only requires dialing a phone number, while a conference participant needs to dial bridge number and a participant code. Further, a conference host needs to dial a bridge number followed by a host code. With the right information, the system can automate session setup.

The system can also include a feedback mechanism to improve the machine learning algorithm if the system cannot perfectly extract the correct numbers. The feedback mechanism can help the system learn new patterns, update existing patterns, and remove obsolete patterns.

One-click conferencing is one example that illustrates the automatic session setup approach based on machine learning. In enterprises, people often spend several minutes to gather the bridge number, participant code, web conferencing link, etc. and then dial from the phone and copy links to browsers. For knowledge workers that may have several meetings scheduled in one day, one-click conferencing can greatly improve their productivity by reducing conference setup time. The system using machine learning can train data collection with much reduced user involvement and administrative work, determine dialing sequence and user roles, and collect feedback information and retraining. The system can implement an efficient decision tree learning algorithm, described below. The system can communicate via the Session Initiation Protocol (SIP).

In the machine learning approach, the system applies a very specific usage of text mining to find out the meanings of numbers. More specifically, the system can focus on dialable numbers for making calls. In addition, the meanings of the numbers may not be in a well-formatted string, as we showed in last section. To identify the meanings, the system can collect information from people's telecommunication actions.

The machine learning field includes many different machine learning algorithms, such as decision trees, Bayesian statistics, artificial neural network, and regression analysis. In one example implementation, the system uses decision trees to represent the patterns for its simplicity and efficiency. However, the system can be implemented using any one or more machine learning algorithm. The example system can include any or all of three parts: a client part, a server part, and a data source part. The client part includes applications running on users' desktops for browsing and call control functions, as well as users' phones. The server part includes web server and applications for fetching, processing, learning, and classifying data. The server part also has a database for data maintenance, a Communication Manager (CM) as a communication server, and a conference server. The data source part feeds email or appointments to the server part through different adapters on the web server.

The disclosure now turns to a discussion of the control flow of handling one-click conferencing. When the disclosure refers to 'one-click conferencing', the term can also be applied to other user interactions besides mouse clicks and can even be applied to system actions that require no user interaction. First, the system collects appointments and call data to build the initial training set. The learner can then learn from the training set and setup a classifier to put different numbers into different classes. When a new appointment comes in, the classifier obtains the meanings of the numbers in the appointment, constructs the dialing sequence, and sends the information to the call control agent, such as via a JavaServer Page (JSP). The call control agent then instructs the phone or other communication device to make the call and dial or otherwise enter the access code.

The system collects training data automatically by monitoring users' communication activities, such as by subscribing to the Communication Manager for SIP dialog events and key pressing events (KPML). By checking the temporal relationship between the events and users' appointments, the system can detect the meanings of the numbers in appointments. The following pseudo code shows how to get a training entry:

```
foreach dlg in dialog_events {
    if (dlg.state == "confirmed") {
        // only check connected calls
        kpml = search kpml_events with dlg.call_id
        code = null;
        if (kpml.timestamp - dlg.timestamp < ts) {
            // access code should be dialed at the
            // beginning of a call
            code = kpml; //save access code info
        }
        // find appointments close to the call
        appt = search appts close to dlg.timestamp
        if (appt contains dlg.target and code) {
            get context around dlg.target and code
            and build a training entry
        }
    }
}
```

In the pseudo code, the context of a number contains the following information: the words before and after the number, the meta information, such as the sender and receiver of an email, the size of emails and the position of the number in an email or appointment, e.g., subject line, beginning, middle, or end of an email. The context information and the number itself can help to build decision rules to classify numbers.

The above pseudo code does not distinguish between a host code (a host code is owned by conference host, which can control the conference) and a participant code for a conference. The system can further check the dialing sequences of other users and use the following assumptions to distinguish host code and participant code: first, usually only one user will dial the host code, while multiple users can dial the participant code. Second, usually the meeting organizer dials the host code. Third, mostly, the sender does not put host code in appointment, but will dial the code when hosts the conference.

The following pseudo code shows one approach for obtaining the dialing role:

```
users = recipients of an appointment
potential_hc = code dialed by sender
if (potential_hc not in appointment) {
    hostcode = potential_hc
    build inferring entry from participant code
    to host code
} elseif (potential_hc dialed once) {
    hostcode = potential_hc
} elseif (number of dialing potential_hc <
    number of dialing the other code) {
    hostcode = potential_hc
}
```

Once the system has acquired sufficient training data, the system can then use machine learning to create patterns. The system can save the learned result as a classifier in the database, loaded when the system starts, and applied when a new appointment comes in to get dialing sequence. The disclosure discusses the detailed learning algorithm below in detail.

The call control part makes calls based on the dialing sequences. The system can use first-party call control to directly control IP phones. In this implementation of call control, from the user's point of view, first-party call control is more natural. The system can dial out as what users normally do. Third-party call control, while possible to use in this system, requires users to answer calls to themselves for making outgoing calls.

If the system misclassifies the numbers for a meeting, the user may choose to dial different number to join the meeting. In this case, the system should be able to first provide a convenient user interface for the user to easily change the dialing numbers, and second collect the changed numbers and add a new training entry to retrain our decision tree. The disclosure discusses how to handle feedback in more detail below.

The disclosure now turns to more detail of the decision tree learning based on the training set, including how to represent the training information, how to apply the training result, and how to re-train the decision trees. Below are some sample appointments from actual correspondence, with the telephone numbers changed. Some sample appointments are short and can be included as an email subject, while others are longer and can be found in an email body.

Meet with summer interns 123-456-7890 pc 123456

Review of product backlog 123-456-7890 or 666-AVAYA-77, Participant code 654321

Team Meeting +1 123-456-7890: Participant Code: 123456# https://webconferencing.avaya.com/default.htm?ConfRef=111111&Pin=123456

123 456 7890 p 987654 h 567890

Run thru slides with speaker notes 111-222-3333 passcode 7777777#

Marketing Plans Bridge: 123-456-7890 Participant code: 654321

Dial +1-234-456-7890: PC: 987654; HC: 567890

BT Conference Call Details: Tel: +44 (0)1296 619 850 Pin No.: 748908#

Dial-in #888.285.4585 Host Code:869944 (Greg) Participant code: 107058

Dial In number: 216-0900 Passcode: 5879# Chair: Rob Hemstock

Dial In Number: 203-719-0070 Freephone within the U.S.: 877-315-5218 Pin Number: 910410

The Host (or Moderator) will dial in on 1 (888) 689-5736, enter the Passcode 6945190, and then enter the Moderator Code 1998190.

Domestic Dial In Number: 1-800-713-8600 International Dial In Number: 1-801-983-4017 Passcode: 56871

Dial in information: Network: 19-337-0070 For External Dial-in: +1-203-719-0070 Freephone within USA: 1-877-315-5218 Conference Pin: 553815

Based on these appointments, people use different patterns to specify conference information. But mostly, in both companies, for a number in an appointment, the non-number words prior to the number are very important to determine what the number is used for. For example, a same person usually use similar patterns, numbers at the end of a long email usually contains the signature instead of meeting information (size of emails and position of numbers are useful information), and numbers in subject line are more likely to be meeting information. Based on these and similar observations, the system and/or a human operator can construct a training set to include the following information and represent a training entry as a comma separated string:

<sender>, <size>, <position>, <word1>, <word2>, <workd3>, <number>, <class>

In this training entry, <word1>, <word2>, and <word3> refer to the three non-number words prior to a number, and <class> refers to the classification of the <number>, obtained from the training set collection program. Each comma-separated value is an attribute for learning. The C4.5 algorithm is one approach to build a decision tree based on containing tree quality measurement mechanism, allowing incremental learning, and supporting tree pruning. While the C4.5 algorithm is discussed as an example algorithm, the system can use this and/or other algorithms. The C4.5 algorithm tries to build the decision tree with least entropy, which means it uses the most important attribute to split the decision tree at any branch node. This infers that, when the learning result is applied to classify a number, in average, the system uses the least number of comparisons to get the result. One algorithm, based on C4.5, called Incremental Tree Induction (ITI) can perform incremental learning, which means that for new training data, the system do not need to rebuild the whole decision tree. In addition, both C4.5 and ITI allow decision tree pruning, which can help to remove irrelevant attributes for number classification. The decision tree can include nodes representing information such as words, participants, participant codes, numbers, and so forth. The decision tree connects nodes with arcs representing decision results, such as "=participant", "!=participant", "=code", "!=code", "is_numeric", or "is_not_numeric". The decision results can be based on binary, ternary, quaternary, or other decisions.

After training, the system can save the training result as well as the training set. The training result can be saved as a classifier in binary format, while the training set can be saved as comma separated strings. When the system starts, the system loads the training result for classifying new appointments.

It is inevitable that the machine learning algorithm sometimes misclassifies wrong numbers for dialing (false positive) or cannot identify the right numbers for dialing (false negative). In this case, the system can collect user feedback with the correct information and re-train the decision tree. Even if there is no misclassification, the system can implement this action into a training process to enforce the rule. This enforcement can also change the structure of the decision tree. For example, the system can move one node closer to the root of the tree to minimize the entropy of the entire decision tree. When performing validation and re-training, the system can consider re-training incrementally so the system performance does not degrade as the size of the training set increases. The system can also consider how to provide users access to potential correct information, such as other numbers in an appointment.

For the first performance-based consideration, the system can use the ITI algorithm for learning in our research prototype. The ITI algorithm can handle each new training entry in a constant time, while the time of using the C4.5 algorithm to train the decision tree increases linearly as the size of training set increases. For the second user access consideration, the system can present the original message to a user and allow the user to drag-and-drop any number to the dialing box. The user can interact with the system via a graphical user interface, voice commands, touchscreen, buttons, or other user interface devices.

In one example implementation, the system for automating communication session setup runs on a JBoss application server with MySQL as the backend database. WebDAV can collect emails and appointments from a Microsoft Exchange server. J48, a Java-based C4.5 implementation in an open-source machine learning package called Weka, can learn an initial decision tree. The system can handle call control via an Extensible Markup Language (XML) based protocol such as SparkXML. The system can provide classification and retraining as web services. Communication features, such as one-click conferencing, can use Simple Object Access Protocol (SOAP) to access these two services. In one web implementation, a one-click conferencing feature is implemented as a widget in which a user can select and drag any number and drop it in any entry box. This provides a convenient way for users to correct misclassifications. The system can also extract the URLs specified in appointments or emails. If the URL contains host code or participant code, when a user joins a meeting through the web interface, the widget can automatically connect to the web conferencing page based on the specified URL.

This disclosure includes architecture for using machine learning to generate an automatic dialing sequence for communication session setup. The system can be implemented as a one-click conferencing widget, for example, to show the machine learning process. This system can be embedded in a context-based communication system and used for daily communication activities.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be implemented as part of a network-based server or as part of a consumer side device. Those skilled in the art will readily recognize various modifications and changes that may be made to the principles described herein without following the example embodiments and applications illustrated and described herein, and without departing from the spirit and scope of the disclosure.

We claim:

1. A method comprising:
   receiving an invitation for a user to join a conference call;
   extracting from the invitation a scheduled conference call time, conference call address information, conference call authentication information, and a conference call modality;
   identifying a resource associated with the conference call; and
   scheduling an event to join the user to the conference call via the conference call modality at the scheduled conference call time based on the conference call address information and the conference call authentication information, and scheduling the event further to open the resource in connection with joining the user to the conference call, wherein the event to join the user to the conference does not require user interaction.

2. The method of claim 1, further comprising:
   after the event is scheduled, monitoring user communications for modifications to the conference call; and
   if a modification to the conference call is found, updating the event based on the modification.

3. The method of claim 1, further comprising:
   extracting optional user information that is not necessary to join the conference call; and
   submitting the optional user information when joining the conference call.

4. The method of claim 3, wherein the optional user information is extracted from a user profile.

5. The method of claim 3, wherein the optional user information comprises a text name, a spoken name, an image, a title, a maximum amount of time the user can participate in the conference call, a callback telephone number, schedule information, presence information, and contact information.

6. The method of claim 1, wherein extracting at least one of the schedule conference call time, the conference call address information, the conference call authentication information, and the conference call modality is performed via at least one of fuzzy logic, machine learning, and a regular expression.

7. The method of claim 1, further comprising:
   identifying a conference information template that matches the invitation; and
   extracting the schedule conference call time, the conference call address information, the conference call authentication information, and the conference call modality based on the conference information template.

8. The method of claim 1, further comprising:
   performing a test connection to the conference call based on the event;
   receiving feedback from the test connection; and
   updating at least one of the conference call address information, the conference call authentication information, and the conference call modality based on the feedback.

9. A system comprising:
   a processor; and
   a computer-readable medium having stored thereon instructions which, when executed by the processor, cause the processor to perform operations comprising:
      retrieving a scheduled conference call event stored in an event database of a user, the conference call retrieved before a scheduled time for the scheduled conference call event;
      extracting, from the scheduled conference call event, address information, authentication information, and a modality;
      identifying a resource associated with the conference call;
      establishing a connection to the conference call via the modality based on the address information and the authentication information; and
      joining the user to the connection and opening the resource in connection with joining the user to the conference call.

10. The system of claim 9, wherein the address information comprises at least one of a telephone number, a web address, a video conference address, and an IP address.

11. The system of claim 9, wherein the authentication information comprises at least one of a password, a pass code, and a personal identification number.

12. The system of claim 9, wherein the system retrieves the conference call at an interval before the schedule time, wherein the interval is based on an expected amount of time required to connect to the conference call.

13. A non-transitory computer-readable storage medium storing instructions which, when executed by a processor, cause the processor to perform operations comprising:
   receiving an invitation for a user to join a conference call;
   extracting from the invitation a scheduled conference call time, conference call address information, conference call authentication information, and a conference call modality;
   identifying a resource associated with the conference call; and
   scheduling an event to join the user to the conference call via the conference call modality at the scheduled conference call time based on the conference call address information and the conference call authentication information, and scheduling the event further to open the resource in connection with joining the user to the conference call, the event to join the user to the conference does not require user interaction.

14. The non-transitory computer-readable storage medium of claim 13, storing additional instructions which, when executed by the processor, result in operations further comprising:
- extracting optional user information that is not necessary to join the conference call; and
- submitting the optional user information when joining the conference call.

* * * * *